United States Patent [19]
Capewell et al.

[11] 3,898,817
[45] Aug. 12, 1975

[54] ACTUATOR WITH A TORQUE LIMITING DEVICE

[75] Inventors: Terence John Capewell, Brewood; Donald Craven, Wolverhampton, both of England

[73] Assignee: Joseph Lucas (Industries) Limited, Birmingham, England

[22] Filed: Feb. 11, 1974

[21] Appl. No.: 441,447

[30] Foreign Application Priority Data
Feb. 20, 1973 United Kingdom............ 8210/73

[52] U.S. Cl............ 64/30 E; 64/6; 64/29; 188/134
[51] Int. Cl............................. F16d 7/02
[58] Field of Search...... 64/30 E, 30 D, 30 A, 30 R, 64/29, 6; 188/134

[56] References Cited
UNITED STATES PATENTS
| | | |
|---|---|---|
| 3,367,456 | 2/1968 | Bohnhoff............................ 188/134 |
| 3,542,162 | 11/1970 | Kear et al.......................... 188/134 |
| 3,596,740 | 8/1971 | Nau.................................... 188/134 |
| 3,797,614 | 3/1974 | McCay................................ 188/134 |

Primary Examiner—Samuel Scott
Assistant Examiner—Randall Heald
Attorney, Agent, or Firm—Holman & Stern

[57] ABSTRACT

A rotary actuator with a torque-limiting device comprises an input shaft, an axially aligned output shaft driven by the input shaft via reduction gearing. The output shaft is connected to the reduction gearing via a coupling which moves axially of the output shaft when the torque thereon exceeds a predetermined value. This axial movement of the coupling actuates a brake between the input shaft and a relatively stationary part of the actuator.

7 Claims, 1 Drawing Figure

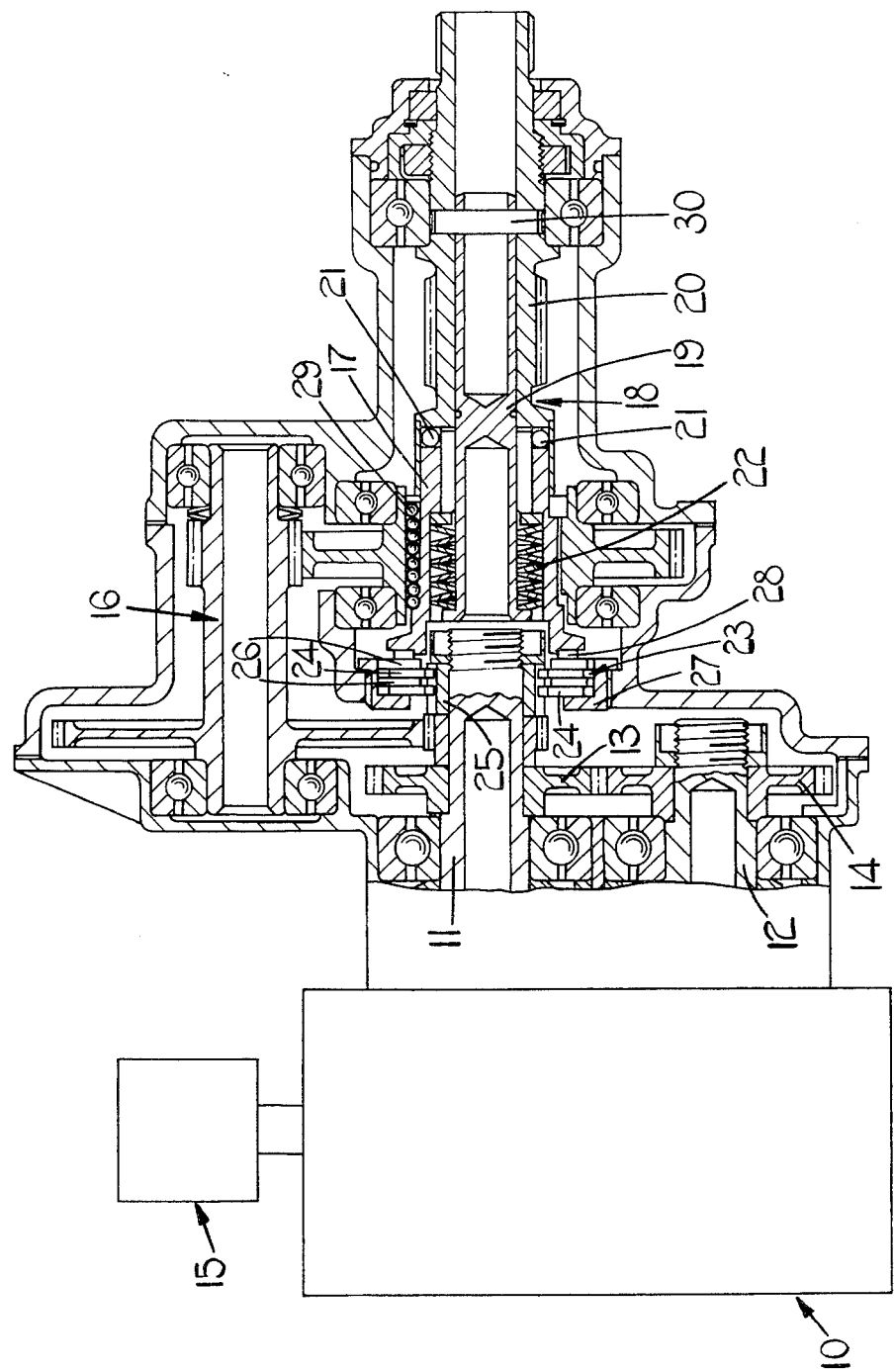

ACTUATOR WITH A TORQUE LIMITING DEVICE

This invention relates to a rotary actuator with a torque-limiting device, and is particularly applicable to an actuator which is intended for use in the control system of an aircraft, for example for swivelling the jet nozzles of an engine used both for lift and forward propulsion.

A rotary actuator in accordance with the invention comprises a housing, a drive shaft journalled in the housing, a coaxial output shaft journalled in the housing, a coaxial coupling member movable axially of the drive and output shafts, a reduction gear train connecting the drive shaft to the coupling member, coupling means between the coupling member and the output shaft arranged to transmit power from the coupling member to the output shaft and to cause axial displacement of the coupling member when the torque transmitted through the coupling means exceeds a predetermined value, and a brake on the drive shaft arranged to be actuated by such axial displacement of the coupling member.

An example of the invention is shown in section in the accompanying drawing.

The actuator includes an air motor 10, of the type having a pair of contra-rotating vanes or paddles. The motor vanes are mounted on respective shafts 11, 12 journalled in the housing of the actuator and connected together by gears 13, 14. Airflow to the motor 10 is controlled by a valve 15 which will not be described in detail.

The shaft 11 is also connected by a reduction gear train 16 to a coaxial coupling member 17 which is movable axially on an output shaft 18. Coupling member 17 is drivingly connected to gear train 16, for free axial movement relative thereto, by means of splines having interposed balls 29. The output shaft 18 is, in fact, in two parts, namely a spigot part 19 extending into the interior of the coupling part 17 and a tubular part 20 to which the spigot part is secured by a pin 30. The tubular part 20 is in end-to-end coaxial relationship with the coupling member 17. The adjacent ends of the part 20 and the coupling member 17 having a V-shaped or similar notches therein and between the part 20 and the member 17 there are interposed a plurality of balls 21. A spring, made up of a stack of spring washers 22, acts between a flange on the spigot part 19 and the member 17 to urge the latter towards the tubular part 20.

Thus the V-notches and the balls 21 constitute a means whereby power can be transmitted from the coupling member 17 to the output shaft 18 and also whereby the coupling member 17 is displaced axially when the torque transmitted exceeds a predetermined value. This value is, in fact, precisely determined by the pre-load on the spring washers 22 and the inclination of the sides of the V-notches referred to above.

The actuator also includes a brake 23 having plates 24 splined to a member 25 which is fixed to the shaft 11. The brake 23 also has interleafed plates 26 splined to a member 27 fixed in the housing. The plates 24, 26 can be pressed together by the coupling member 17 as a result of axial displacement of the latter. A thrust bearing 28 is interposed between the member 27 and an adjacent one of the plates 26. Member 27 includes an abutment for limiting axial movement of the plates 24, 26.

Thus, in use, power from the air motor 10 can be transmitted via the gear train 16 and the coupling member 17 to the output shaft 18 at all times when the torque load on the output shaft 18 is below a predetermined value. When the torque load exceeds this value the member 17 is displaced axially and actuates the brake 23. The torque applied by the shaft 11 is, of course, lower than that applied by the shaft 18, because of the reduction gear train 16. The brake 23 can, therefore, be a simple one requiring no servo-assistance.

We claim:

1. A rotary actuator comprising a housing, a drive shaft journalled in the housing, a coaxial output shaft journalled in the housing, a coaxial coupling member movable axially of the drive and output shafts, a reduction gear train connecting the drive shaft to the coupling member, coupling means between the coupling member and the output shaft arranged to transmit power from the coupling member to the output shaft and to cause axial displacement of the coupling member when the torque transmitted through the coupling means exceeds a predetermined value, and a brake on the drive shaft arranged to be actuated by such axial displacement of the coupling member.

2. An actuator as claimed in claim 1 in which said coupling member and said output shaft have adjacent, axially-directed, opposed faces, each said face being formed with a plurality of recesses, and said coupling means comprises a plurality of coupling elements, each said coupling element engaging a recess in each of said faces, and said coupling means includes a spring arrangement urging said opposed faces towards one another.

3. An actuator as claimed in claim 2 in which said recesses are V-notches.

4. An actuator as claimed in claim 2 in which said coupling elements are balls.

5. An actuator as claimed in claim 2 in which said spring arrangement comprises a plurality of spring washers.

6. An actuator as claimed in claim 1 which includes a thrust bearing between said brake and said coupling member.

7. An actuator as claimed in claim 1 in which said brake comprises a plurality of plates drivingly connected to said drive shaft for axial movement relative thereto, a plurality of plates mounted in said housing for axial movement only relative to said drive shaft, and an abutment limiting axial movement of said plates in response to said axial displacement of said coupling member.

* * * * *